Figure 1:
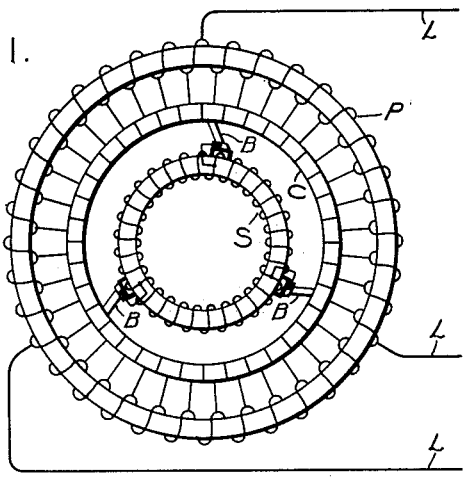

No. 843,774. PATENTED FEB. 12, 1907.
C. P. STEINMETZ.
ALTERNATING CURRENT DYNAMO ELECTRIC MACHINE.
APPLICATION FILED NOV. 28, 1905.

Witnesses:
George W. Tilden.

Inventor:
Charles P. Steinmetz,
by Albert G. Davis
Att'y.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

ALTERNATING-CURRENT DYNAMO-ELECTRIC MACHINE.

No. 843,774.     Specification of Letters Patent.     Patented Feb. 12, 1907.

Application filed November 28, 1905. Serial No. 289,442.

*To all whom it may concern:*

Be it known that I, CHARLES P. STEINMETZ, a citizen of the United States, residing at Schenectady, in the county of Schenectady and State of New York, have invented certain new and useful Improvements in Alternating-Current Dynamo-Electric Machines, of which the following is a specification.

My invention relates to alternating-current dynamo-electric machines, and its object is to provide a novel and efficient form of variable-speed alternating-current motor.

The ordinary induction-motor is essentially a constant-speed machine, and its speed can be varied only at the expense of efficiency. It has been proposed heretofore in order to provide a variable-speed polyphase induction-motor to provide the secondary member with a commutator and brushes and to supply alternating current of variable voltage to the commutator-brushes. With such an arrangement the motor may be caused to operate either above or below synchronism, and its speed may be adjusted by varying the voltage impressed upon the commutator-brushes. The characteristics of such a motor are much like those of a direct-current shunt-motor. Just as the shunt-motor with a given field strength is substantially a constant-speed machine, so the polyphase-motor above referred to, with a given voltage impressed upon the commutator-brushes and with the commutator-brushes in a given position, is also a constant-speed machine, and as the speed of a direct-current shunt-motor may be varied by varying the field strength, so the alternating-current motor may have its speed varied by varying the voltage impressed upon the secondary.

An alternating-current motor of the type above described possesses the serious disadvantage of a very low power factor for varying loads. Although the magnetic effect of the current supplied to the secondary winding through the commutator is the same as would be produced by a current in the secondary winding of a low frequency equal only to the slip of the secondary above or below the synchronous speed, nevertheless the frequency of the current flowing through the brushes is the frequency of the source—that is, of the same frequency as the current supplied to the primary member—and the secondary winding offers to the flow of this current an impedance corresponding to the high frequency. As a result the power factor of the motor is bad, and although for a given load the motor may be compensated by properly positioning the brushes a change of load will destroy the compensation, so that for a variable load the power factor and efficiency of such a motor are poor.

My invention in its broadest aspect consists in supplying to the secondary member of an alternating-current motor a low-frequency current derived from the primary member. I accomplish this by providing a commutator for the primary instead of for the secondary member and brushes bearing on the commutator fixed relatively to the secondary instead of to the primary member. This arrangement, as will hereafter be explained, supplies to the secondary member a current of a frequency corresponding to the slip of the secondary member. For a current of this low frequency the self-induction of the secondary winding is comparatively small, and consequently the power factor of the motor is high.

My invention will best be understood by reference to the accompanying drawing, in which—

Figure 2:
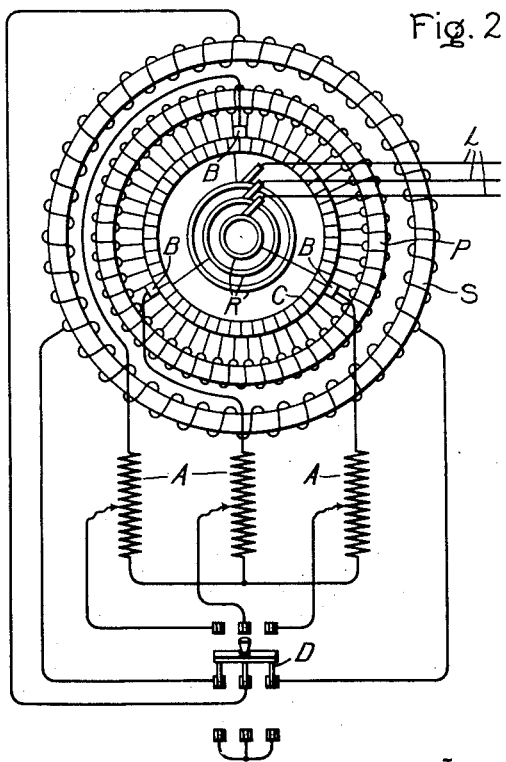

Figure 1 shows diagrammatically an alternating-current dynamo-electric machine arranged in accordance with my invention, and Fig. 2 shows a modification of the same.

Referring first to Fig. 1, P represents the primary member of an alternating-current motor connected to a source of three-phase current, (indicated by the leads L L L.) For the sake of simplicity the primary winding is shown as a Gramme ring; but it will be understood that in practice any well-known form of construction, such as a distributed drum-winding, may be employed. The same remarks apply to the secondary winding S, which is also shown diagrammatically as a Gramme ring. The primary winding P is provided with a commutator C, while the secondary winding is provided with brushes B B B, bearing on the commutator C and connected to fixed points on the secondary winding. Now if it be assumed that the primary winding and its commutator are stationary, while the secondary winding S and the brushes B revolve and three-phase currents are supplied to the primary winding through the leads L, three-phase currents will be supplied to the secondary winding S through the brushes B; but the latter currents will have a frequency corresponding to the difference in speed of the rotation of the primary magnetic field and of the secondary member—that is, if the secondary member were stationary the currents supplied to the secondary member would be of the same frequency as the primary currents. At synchronism the currents through the secondary member would be of zero frequency and at intermediate speeds of a frequency corresponding to the slip of the secondary member. At speeds near synchronism this frequency is very low, and consequently the secondary winding acts almost as a non-inductive circuit for these currents. As a result the power factor of such a motor is much higher than when the secondary winding is provided with a commutator and full-frequency current supplied through commutating-brushes.

In order to avoid the stationary commutator and revolving brushes, (shown in Fig. 1,) I prefer the arrangement shown in Fig. 2. In this arrangement the primary winding P is made rotatable and is provided both with a commutator C and with collector-rings R, by means of which current is supplied from the source through the leads L. Stationary brushes B bear on the commutator and lead off the low-frequency current for the secondary winding. In order to vary the motor-speed, current-controlling means are inserted between the brushes B and the secondary winding S. These devices are indicated at A and may consist of inductive devices, such as autotransformers, or of variable resistances, or both. As the voltage impressed on the secondary winding is decreased the condition of the secondary winding approaches more closely a short circuit and the motor approaches synchronous speed. I have indicated a switch D, by means of which the secondary winding may be disconnected from the brushes B B and short-circuited upon itself when synchronism is reached, if it is desired to operate the motor at synchronous speed. When the switch D is thrown to its lower position, the brushes B B may be raised from the commutator, if desired.

While I have described my invention with particular reference to an alternating-current motor, in most of its aspects it is equally applicable to self-exciting alternating-current generators as well, or, in other words, it is broadly applicable to any dynamo-electric machine in which it is desired to supply low-frequency currents to one of the members of the machine.

What I claim as new, and desire to secure by Letters Patent of the United States, is—

1. In a dynamo-electric machine, relatively rotatable primary and secondary members; connections for supplying alternating current to the primary member, and means for supplying to the secondary member low-frequency currents derived from the primary member.

2. In a dynamo-electric machine, relatively rotatable primary and secondary members, connections for supplying polyphase current to the primary member, and means for supplying to the secondary member currents of a frequency equal to the difference in the speeds of rotation of the primary magnetic field and of the secondary member.

3. In a dynamo-electric machine, relatively rotatable primary and secondary members, connections for supplying alternating current to the primary member, a commutator carried by the primary member and having its segments connected to points on the primary winding, brushes bearing on said commutator, and connections for supplying current from said brushes to the secondary member.

4. In a dynamo-electric machine, relatively rotatable primary and secondary members, connections for supplying polyphase currents to the primary member, a commutator carried by the primary member and having its segments connected to points on the primary winding, a polyphase arrangement of brushes bearing on said commutator, and connections for supplying current from said brushes to the secondary member.

5. In a dynamo-electric machine, a rotatable primary member provided with a commutator and collector-rings, brushes bearing on said collector-rings and connected to a source of alternating current, brushes bearing on said commutator, a stationary secondary member, and connections for supplying current from the commutator-brushes to the secondary member.

6. In a dynamo-electric machine, relatively rotatable primary and secondary members, connections for supplying alternating current to the primary member, means for supplying to the secondary member low-frequency currents derived from the primary member, and means for controlling the amount of said low-frequency currents.

7. In a dynamo-electric machine, relatively rotatable primary and secondary members, connections for supplying polyphase currents to the primary member, means for supplying to the secondary member currents of a frequency equal to the difference in the speeds of rotation of the primary magnetic field and of the secondary member, and means for controlling the amount of said derived currents.

8. In a dynamo-electric machine, relatively rotatable primary and secondary members, connections for supplying alternating current to the primary member, a commutator carried by the primary member and having its segments connected to points on the primary winding, brushes bearing on said commutator, connections for supplying current from said brushes to the secondary member, and current-controlling means in the last-mentioned connections.

9. In a dynamo-electric machine, relatively rotatable primary and secondary members, connections for supplying polyphase currents to the primary member, a commutator carried by the primary member and having its segments connected to points on the primary winding, a polyphase arrangement of brushes bearing on said commutator, connections for supplying current from said brushes to the secondary member, and current-controlling means in the last-mentioned connections.

10. In a dynamo-electric machine, relatively rotatable primary and secondary members, connections for supplying alternating current to the primary member, means for supplying to the secondary member low-frequency currents derived from the primary member, and means for short-circuiting the secondary member.

11. In a dynamo-electric machine, relatively rotatable primary and secondary members, connections for supplying polyphase currents to the primary member, means for supplying to the secondary member currents of a frequency equal to the difference in the speeds of rotation of the primary magnetic field and of the secondary member, and means for short-circuiting the secondary member.

12. In a dynamo-electric machine, relatively rotatable primary and secondary members, connections for supplying alternating current to the primary member, a commutator carried by the primary member and having its segments connected to points on the primary winding, brushes bearing on said commutator, connections for supplying current from said brushes to the secondary member, and means for short-circuiting the secondary member.

13. In a dynamo-electric machine, relatively rotatable primary and secondary members, connections for supplying alternating current to the primary member, connections for supplying to the secondary member low-frequency currents derived from the primary member, and means for breaking the last-mentioned connections and short-circuiting the secondary member.

14. In a dynamo-electric machine, relatively rotatable primary and secondary members, connections for supplying alternating current to the primary member, a commutator carried by the primary member and having its segments connected to points on the primary brushes bearing on said commutator connections for supplying current from said brushes to the secondary member, and means for breaking said connections and short-circuiting the secondary member.

In witness whereof I have hereunto set my hand this 27th day of November, 1905.

CHARLES P. STEINMETZ

Witnesses:
BENJAMIN B. HULL,
HELEN ORFORD.